April 15, 1941.  W. FERRIS  2,238,218
SPEED CONTROLLER FOR PRIME MOVERS
Filed Sept. 28, 1936  4 Sheets-Sheet 1

INVENTOR
WALTER FERRIS
BY
Wesley M Merrill
ATTORNEY.

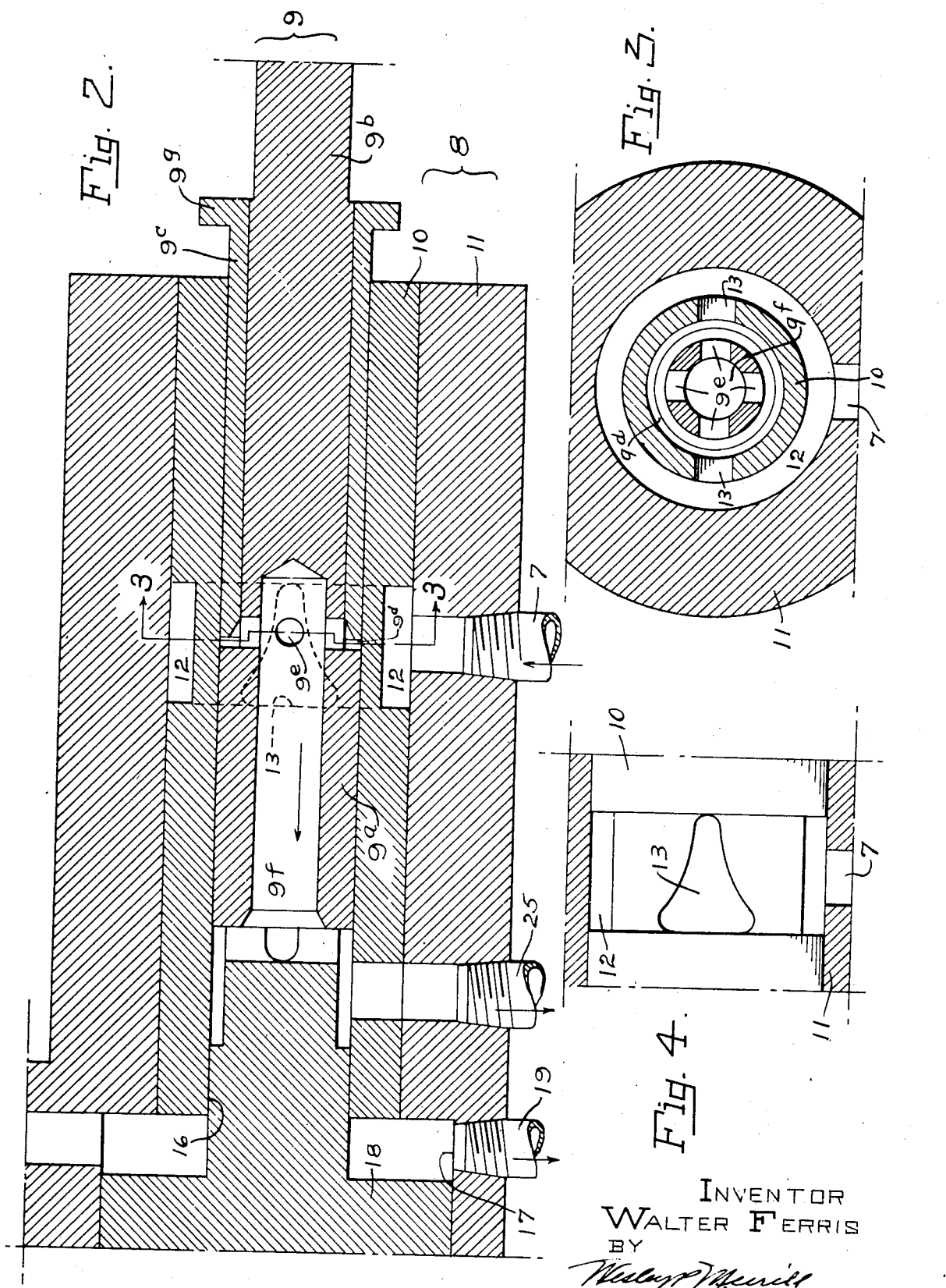

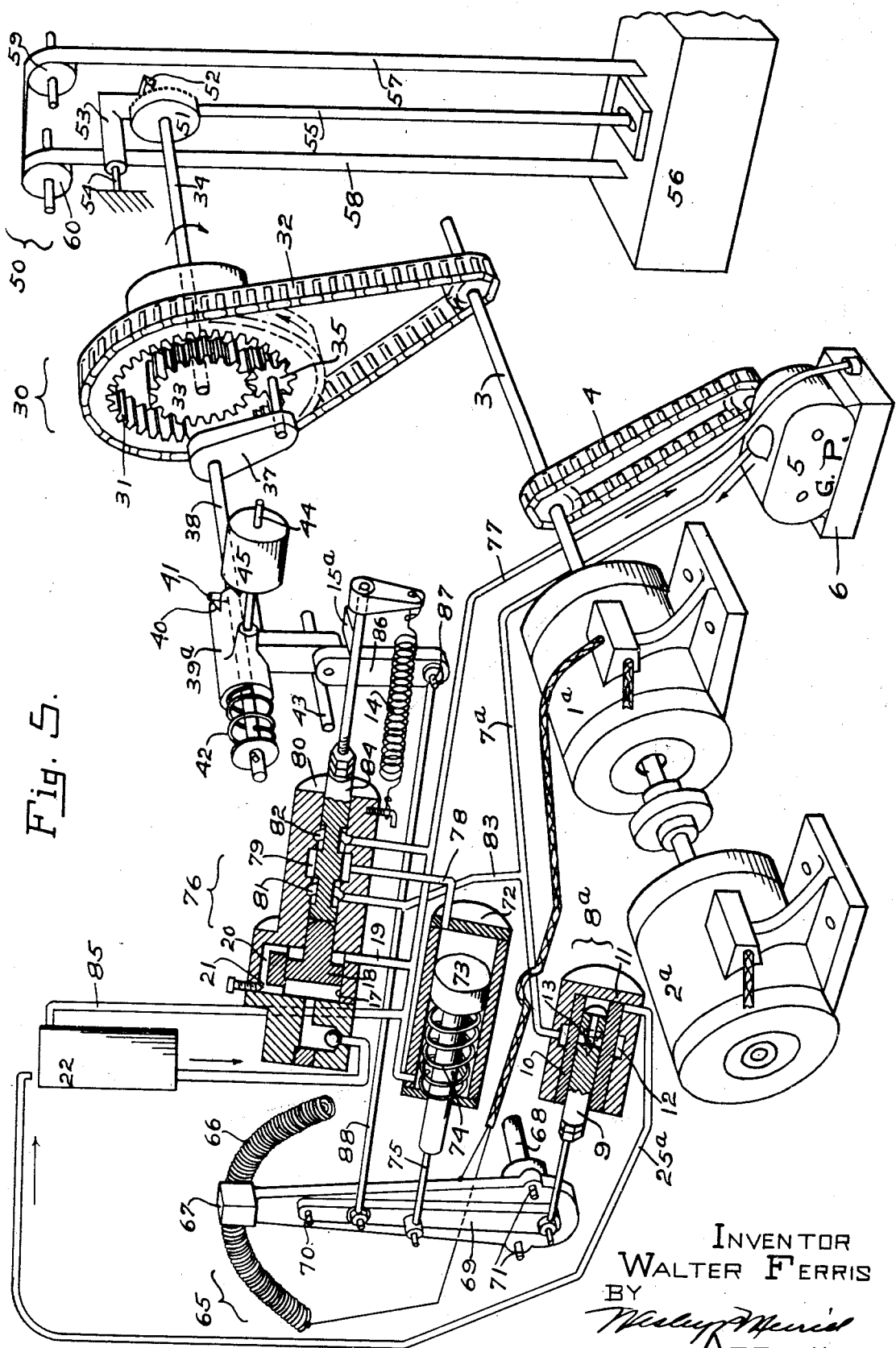

Patented Apr. 15, 1941

2,238,218

UNITED STATES PATENT OFFICE 2,238,218

SPEED CONTROLLER FOR PRIME MOVERS

Walter Ferris, Milwaukee, Wis.

Application September 28, 1936, Serial No. 102,850

17 Claims. (Cl. 264—9)

This application is a continuation in part of my copending application Serial No. 47,008, filed October 28, 1935 which has since matured into Patent No. 2,198,035.

The invention relates to speed controllers for prime movers and it is particularly adapted for controlling prime movers the speeds of which vary in response to variations in the loads thereon.

The speeds of certain prime movers such as synchronous electric motors, remain substantially constant under varying loads but the speeds of other prime movers, such as direct current and induction motors, steam engines and gasoline engines, decrease as the loads thereon increase and increase as the loads thereon decrease. Even the speed of a synchronous motor is not absolutely constant for the reason that the frequency of the power circuit fluctuates more or less even when the generator supplying power to the circuit is controlled by chronometric mechanisms which presumably keeps the frequency constant but which in practice simply keeps the overall frequency constant during a given period of time, for instance 8 to 12 minutes, so that electric clocks may be operated from the circuit.

In certain processes, it is very desirable that a machine or a machine part be operated at a constant adjustable speed or at a uniformly varying speed but the variable speed prime movers now in use will not operate at uniform speeds under varying loads.

If it is attempted to maintain the speed of a variable speed prime mover constant or at a uniformly varying rate by means of a controller which is operated at least in part by a synchronous motor, such as the disk type controller shown in my copending application referred to above, the variations in the speed of the synchronous motor will prevent the controller from maintaining prime mover speed constant or at a uniformly varying rate. The controller shown in that application will keep the prime mover speed within closer limits than was previously possible, nevertheless the errors in the speed of a synchronous motor will be reflected by variation in the speed of the prime mover.

The present invention has as an object to provide a controller which will maintain the speed of a prime mover substantially constant under varying loads.

Another object is to provide a controller of the above character which will maintain the speed of a prime mover substantially constant regardless of variations in the supply of energy to the prime mover.

Another object is to provide a controller of the above character which is positive and precise in operation.

Other objects and advantages will appear from the description hereinafter given of controllers in which the invention is embodied.

According to the invention in its general aspect and as embodied in practice, a brake load is applied to the prime mover in addition to the useful load driven thereby, and the controller varies the brake load inversely to variations in the useful load in response to variations in the useful load or variations in the energy supply as reflected in the tendency to vary the speed of the prime mover.

According to the invention in another aspect, the prime mover drives in addition to its useful load a small capacity pump which delivers its output through a resistance and thereby exerts a brake load upon the prime mover. The resistance is adjusted in response to any movement of the output leg of a three legged differential which has one of its input legs driven by the prime mover and its other input leg driven at a constant speed under the control of the chronometric mechanism, whereby any variation in the prime mover speed changes the ratio between the speed of the two input legs of the differential and thereby causes the output leg thereof to move and adjust the resistance with a resultant variation in the brake load on the prime mover.

According to the invention in another aspect, means are provided for varying the brake load on the prime mover to correct limited variations in prime mover speed, and additional means are provided for varying the flow of energy to the prime mover to anticipate and prevent wider variations in prime mover speed.

The invention is exemplified by the controllers shown schematically in the accompanying drawings in which the views are as follows:

Fig. 2 is a central longitudinal section through a throttle valve which is ordinarily employed in the controller shown in Fig. 1.

Fig. 3 is a transverse section taken on the line 3—3 of Fig. 2.

Fig. 4 is an outside view of a part of a sleeve and shows the shape of the orifice formed therein.

Fig. 5 is a view similar to Fig. 1 but showing the controller employed to control the speed of an electric motor by varying the brake load thereon and by also varying the flow of energy thereto.

Figure 1:
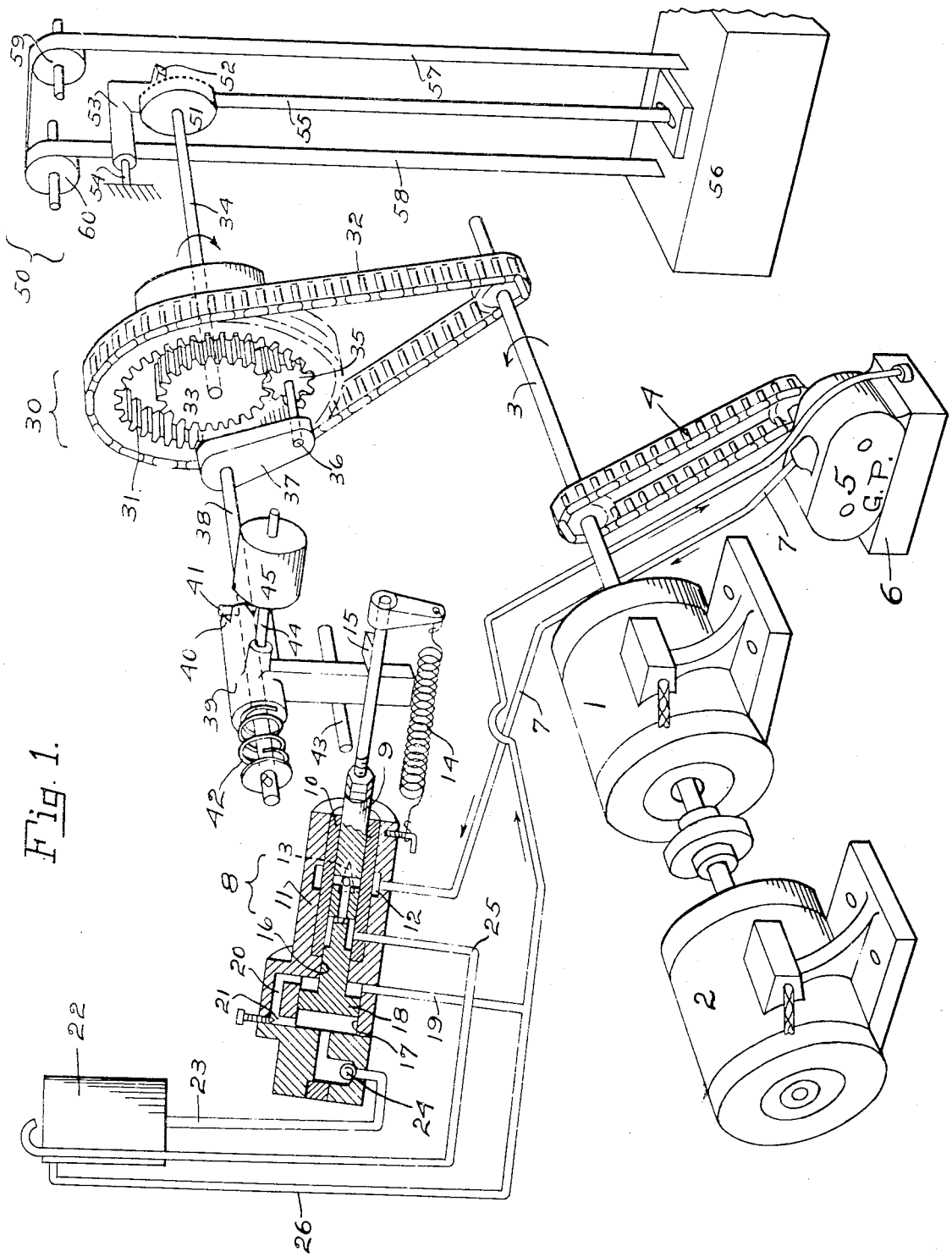
Fig. 1 is a schematic view showing the controller as being employed to control the speed of a small capacity prime mover by applying a brake load to the prime mover and varying it in response to variations in prime mover speed.

While for the purpose of illustration the invention has been shown embodied in controllers for electric motors, it is adaptable to the control of other types of prime movers the speeds of which vary in response to variations in the loads thereon and, while the brake mechanism shown comprises a pump driven by the prime mover to be controlled and dissipating by means of a throttle valve a part of the energy delivered by the prime mover, a friction or other type brake may be used to dissipate the energy and thus control the speed.

Fig. 1

The controller is shown in this figure as being employed to control the speed of an electric motor 1 which is shown connected to an electric generator 2 to drive the same. Generator 2 may be of the synchronous type and employed to generate current for energizing synchronous motors which drive speed control devices, such as the disk type control unit of the transmission shown in the application referred to above.

Motor 1 is provided with a brake shaft 3 which is connected through a drive 4 to a gear pump 5 to drive the same. Gear pump 5, which functions to exert a brake load upon the motor 1, draws liquid from a reservoir 6 formed in the base of the pump casing and discharges it into a channel 7.

The discharge of liquid through channel 7 by pump 5 is resisted by a throttle valve 8 which is operated in response to variations in the speed of motor 1 and varies the resistance to the flow of liquid through channel 7 to thereby vary the brake load on motor 1.

For simplicity in illustration, valve 8 has been shown in Fig. 1 as being provided with a valve member or plunger 9 which is closely fitted in the bore of a sleeve 10 to reciprocate therein. Sleeve 10 is tightly fitted in a vlave body 11 having formed therein around sleeve 10 a groove 12 with which channel 7 communicates. Groove 12 communicates with the bore of sleeve 10 through two or more orifices 13 which are formed in the wall of sleeve 10 and are somewhat triangular in shape. Only one orifice 13 has been shown in Fig. 1 but two or more are ordinarily provided and equally spaced around sleeve 10 in order that valve member 9 may be hydrostatically balanced. Liquid may flow, at a rate determined by the position of valve member 9, from groove 12 through orifices 13 into the bore of sleeve 10 from which it may escape into a suitable exhaust channel connected thereto.

In practice, a valve member 9 of the type shown in Figs. 2, 3 and 4 is ordinarily employed. This valve member consists primarily of a part 9a, which is closely fitted in the bore of sleeve 10 to reciprocate therein, a part 9b which is considerably smaller in diameter than part 9a and formed integral therewith, and a sleeve 9c which is pressed onto part 9b with its left end spaced a short distance from the end of part 9a to form a narrow annular groove 9d therebetween. The end of sleeve 9c is undercut to increase the cross sectional area of groove 9d.

Groove 9d has its narrow outer part in communication at all times with the orifices 13 in sleeve 10 and its wider inner part in communication at all times through a plurality of radial ducts 9e with an axial bore 9f which extends throughout the length of part 9a and into part 9b. In order to prevent groove 9d from passing out of registry with orifices 13 when valve member 9 is shifted toward the left, sleeve 9c has a flange 9g formed upon its outer end and so positioned that it will abut the end of sleeve 10 when groove 9d registers with the left ends of orifices 13.

The arrangement is such that liquid may flow from channel 7 through groove 12, orifices 13, groove 9d, ducts 9e, bore 9f and the bore in sleeve 10 into the exhaust channel. When flange 9g is in contact with the end of sleeve 10, groove 9d will register with the widest part of each orifice 13 and the resistance to the discharge of liquid from pump 5 will be the least.

Moving valve member 9 toward the right will decrease the effective areas of orifices 13. That is, as valve member 9 is moved toward the right, groove 9d will register with narrower parts of orifices 13, and consequently increase the resistance to the flow of liquid therethrough, until groove 9d registers with the right ends of orifices 13 at which time the effective areas of orifices 13 will be the smallest and the resistance to the discharge of liquid from pump 5 will be the greatest.

Valve member 9 is urged by a spring 14 toward the left or in a direction to increase the effective areas of orifices 13, and it is adapted to be moved toward the right or in a direction to decrease the effective areas of orifices 13 by a mechanism which will be presently described and which engages a lug 15 fixed to the stem of valve member 9.

The movement of valve member 9 toward the left is preferably retarded as by means of a dashpot. As shown, valve body 11 has a bore 16 and a counterbore 17 formed therein concentric with the bore in sleeve 10 and communicating therewith. A dashpot plunger 18 has its head closely fitted in counterbore 17 and its stem closely fitted in bore 16 and extending therethrough into contact with the left end of valve member 9.

The right or front end of counterbore 17 has a drain channel 19 connected thereto to permit liquid to escape freely therefrom, and both ends of counterbore 17 are connected to each other by a channel 20 to permit plunger 18 to eject liquid from the left or rear end of counterbore 17. Channel 20 has a restricted orifice 21 therein to limit the rate of flow therethrough and thereby limit the rate of movement of valve member 9 when retracted by spring 14.

Liquid may be supplied to the left end of counterbore 17 from any suitable source which will supply it thereto at a low pressure which is sufficient to enable the liquid to move plunger 18 and hold it in contact with the left end of valve member 9 but which is not great enough to affect the accurate operation of valve 8. As shown, liquid is supplied to counterbore 17 from a supply tank 22 through a channel 23 and a check valve 24 which permits liquid to flow from tank 22 into counterbore 17 but prevents it from flowing in the opposite direction.

Tank 22 may be supplied with liquid from any suitable source. As shown, an exhaust channel 25 has its upper end arranged to discharge into tank 22 and its lower end connected to valve body 11 in communication with the interior of sleeve 10 at a point beyond valve member 9 so that all liquid passing through valve 8 is discharged into tank 22.

The volume of liquid passing through valve 8 is greater than the volume required to keep tank 22 filled. For the purpose of illustration, tank 22 is shown connected near its upper end to reservoir 6 by an overflow channel 26 to which channel 19 is also connected. Channel 26 permits the overflow from tank 22 and all liquid discharged from the right end of counterbore 17 to be returned freely to reservoir 6. In practice, however, the entire controller is arranged within an oil tight casing, tank 22 and overflow channel 26 are omitted, and the upper end of channel 23 is arranged high enough to provide the proper head and the liquid for operating the dashpot is discharged into the open end thereof as the overflow does no harm.

When valve member 9 moves toward the right, liquid will flow through check valve 24 into the left end of counterbore 17 and move plunger 18 toward the right so that its stem remains substantially in contact with the end of valve member 9. When valve member 9 stops moving toward the right, check valve 24 will close so that, when valve member 9 is moved toward the left by spring 14 and moves plunger 18 with it, plunger 18 will have to eject liquid from the left end of counterbore 17 through channel 20 and orifice 21, thereby retarding the action of spring 14 and causing valve member 9 to move toward the left at a rate determined by the resistance of orifice 21.

The mechanism for operating valve 8 is substantially the same as the corresponding mechanism illustrated and described in my copending application referred to above, consequently, it is not illustrated nor described in detail herein. It is deemed sufficient to state that this mechanism includes a three legged differential 30 which has one of its legs driven at a speed proportional to the speed of motor 1, a second leg driven at a measured speed and a third leg arranged to operate valve 8 so that any variation in the ratio between the speeds of the first two legs will result in movement of the third leg with resultant operation of valve 8.

As shown, differential 30 includes an internal gear 31 which is driven from shaft 3 by a drive 32 and forms one leg of the differential, a sun gear 33 which is fixed on a shaft 34 and forms the second leg of the differential, and a planet pinion 35 which meshes with both of gears 31 and 33 and forms a part of the third leg of the differential.

Planet pinion 35 is arranged upon a shaft 36 which is carried by a crank 37 at the outer end thereof. Crank 37 is fixed upon one end of a shaft 38 having an operating lever 39 arranged thereon and fixed for rotation therewith by a snap clutch connection. As shown, lever 39 has its hub journaled upon shaft 38 and provided in one of its ends with notches 40, a pin 41 is fixed in shaft 38, and a spring 42 urges lever 39 along shaft 38 to hold one of notches 40 over pin 41.

The lower end of lever 39 is arranged between the lug 15 on the stem of valve 8 and a stationary stop 43 so that, when lever 39 is swung toward the right, it will operate valve 8 and, if it should be swung too far toward the left, it would engage stop 43 before passing beyond its effective range. Further rotation of shaft 38 toward the left would cause pin 41 to move from one notch 40 into the adjacent notch 40. Thus the pin 41, notches 40 and spring 42 co-act to form a snap clutch to prevent breakage.

Lever 39 has a driving arm 44 fixed to its hub and provided with a weight 45 which is lifted as shaft 38 rotates in a counterclockwise direction and descends as shaft 38 rotates in a clockwise direction, thus providing a constant clockwise driving torque proportional to the mass and radius of the weight. This torque is continuously applied to crank 37 and by it transmitted through shaft 36, planet pinion 35 and sun gear 33 to shaft 34 which is thus driven in a clockwise direction by a constant force.

The speed of shaft 34 is controlled by a chronometric mechanism 50 which includes an escape wheel 51 fixed upon shaft 34. The teeth of escape wheel 51 are engaged by two pallets 52 extending from opposite sides of an escape lever 53 which is pivoted above escape wheel 51 upon a stationary pivot 54.

A stiff rod 55 has its upper end fixed to escape lever 53 and its lower end fitted in and freely slidable through a pendulum bob 56 which is supported by two thin and flexible ribbons 57 and 58 from two drums 59 and 60. Ribbon 57 passes over drum 59 and both ribbons are fastened to drum 60 so that rotation of drum 60 will lengthen or shorten the pendulum.

Rotation of brake shaft 3 rotates differential gear 31 in a counterclockwise direction at a speed proportional to the speed of motor 1. Gear 31, acting through pinion 35 and sun gear 33, tends to rotate shafts 34 and 38 in opposite directions but, since rotation of shaft 38 by gear 31 is resisted by weight 45, gear 31 tends to rotate shaft 38 in a clockwise direction at a speed proportional to the speed of prime mover 1 but it cannot do so for the reason that pallets 52 engage the teeth of escape wheel 51 intermittently and prevent rotation of shaft 34 during the larger part of each pendulum swing, thereby causing gear 31 through pinion 35 to rotate shaft 38 in a counterclockwise direction and raise weight 45. As each pallet 52 releases a tooth of escape wheel 51, weight 45 drops suddenly and transmits a driving force through differential 50, thereby rotating shaft 34 at high speed in a clockwise direction until the other pallet 52 engages a tooth of escape wheel 51.

Shaft 34 is thus intermittently rotated at a constant overall speed which is proportional to the frequency of the pendulum, and shaft 38 during each cycle of the pendulum is oscillated and swings lever 39 gradually toward the right and then suddenly toward the left through a limited arc.

As long as the speed of gear 31 remains proportional to the overall speed of shaft 34, the net rotation of shaft 38 will be zero and lever 39 and weight 45 will be swung through arcs the lengths of which remain substantially constant. If the speed of gear 31 should increase or if the speed of sun gear 33 should decrease, planet pinion 35 would be carried around in a counterclockwise direction, simultaneously lifting weight 45. This movement of planet pinion 35 results from the teeth being driven on one side by gear 31 and held back on the other side by sun gear 33. Conversely, if the speed of gear 31 should decrease or if the speed of gear 33 should increase, planet pinion 35 would be carried around in a clockwise direction thereby rotating shaft 38 in the same direction and lowering weight 45.

As previously explained, shaft 38 swings lever 39 through a limited arc first in one direction and then in the opposite direction during each cycle of the pendulum. If lever 39 were connected to valve 8, it would shift the valve 8 a substantial distance in each direction and thereby cause a considerable fluctuation in the brake load on motor 1 although the net brake load over a plurality of oscillations would remain constant as long as the motor speed remained constant.

With the construction shown however, lever 39 simply contacts lug 15 and then moves valve 8 toward the right a very short distance near the end of each lifting movement of weight 45. Then when weight 45 falls, lever 39 swings suddenly toward the left out of contact with lug 15 and permits spring 14 to shift valve 8 toward the left. However, spring 14 is opposed by dashpot 17—18 and is able to move valve 8 through only a very short distance before lever 39 again swings toward the right and returns valve 8 to its previous position with the result that the net brake load on motor 1 remains constant and the momentary fluctuation in brake load is very small.

If the speed of motor 1 should increase due to any cause, such as a reduction in useful load thereon or a variation in frequency in the energizing current, gear 31 would be accelerated relative to the speed of sun gear 33 and cause planet pinion 35 to rotate shaft 38 in a counterclockwise direction and thereby shift the operating arc of lever 39 in a counterclockwise direction so that valve 8 would be shifted toward the right to reduce the effective areas of orifices 13 and thereby increase the brake load until motor 1 was decelerated to the desired speed.

If the speed of motor 1 should decrease due, for instance, to a variation in the frequency or useful load, gear 31 would be decelerated relative to the speed of sun gear 33 and cause planet pinion 35 to rotate shaft 38 in a clockwise direction and thereby shift the operating arc of lever 39 in a clockwise direction so that valve 8 will be shifted toward the left to increase the effective areas of orifices 13 and thereby decrease the brake load until motor 1 was accelerated to the desired speed.

After each correction of motor speed, lever 39 will oscillate in its new range and the controller will continue to function in the above described manner until another variation in useful load or frequency causes another variation in motor speed at which time lever 39 will be shifted to another range to correct such variation.

The controller shown in Fig. 1 thus maintains the speed of a prime mover constant by applying a brake load thereon and varying the brake load in response to variations in prime mover speed. It is intended to be employed for controlling only prime movers of small capacity or prime movers the loads on which vary through a very limited range as otherwise the power wasted in overcoming the brake load would render the controller uneconomical.

In order to avoid undue waste of power when the controller is employed to maintain constant the speed of a larger capacity prime mover which drives a variable load, the controller may be provided with means for varying the flow of energy to the prime mover in addition to the means for applying a brake load thereon and varying the brake load in response to variations in prime mover speed. The brake load may be varied to compensate for slight variations in the useful load or, in the case of an electric motor, to compensate for slight variations in the frequency or voltage of the energizing current, and the flow of energy to the prime mover may be varied to compensate for wider variations in load or energizing current.

Figure 6:
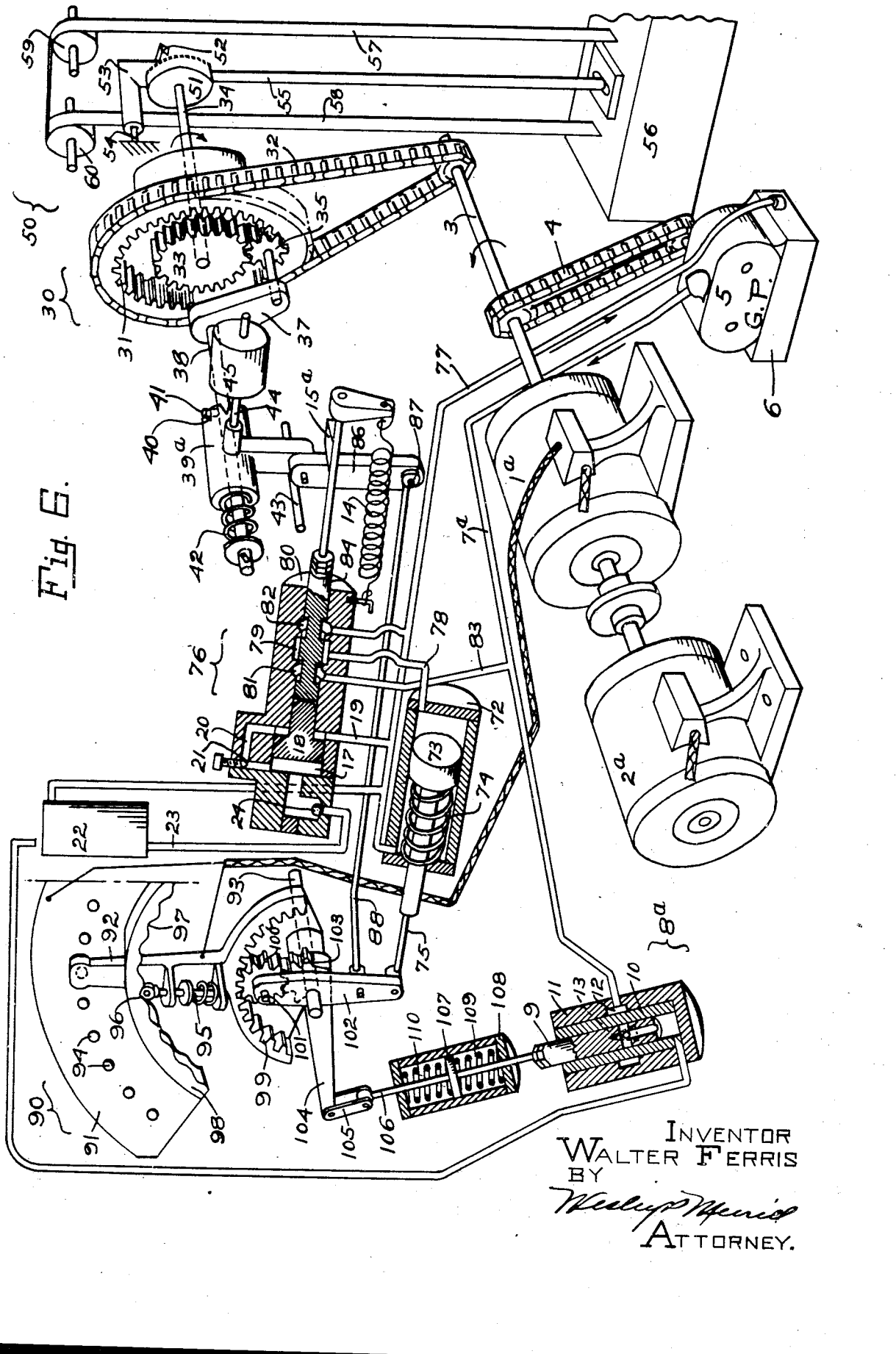
Fig. 6 is a view similar to Fig. 5 but showing the controller provided with means for varying the flow of energy to the motor in definite steps.

For the purpose of illustration, the controller is shown in each of Figs. 5 and 6 as being employed to control the speed of an electric motor by varying a brake load thereon to compensate for slight variations in useful motor load or slight variations in the frequency or voltage of the energizing current and by varying the field strength of the motor to compensate for wider variations in load or frequency but it is to be understood that the controller may as readily be employed to control the speed of other types of prime movers by simply replacing the rheostat which controls the field strength with a controller suitable to the particular type of prime mover to be controlled.

Fig. 5

The controller is shown in this figure as being employed to control the speed of an electric motor 1ª which drives a useful load such as a generator 2ª. Variations in the speed of motor 1ª due to wide variations in either the useful load or in the voltage of the energizing current are corrected by varying the strength of the motor field while variations in motor speed due to limited variations in load voltage or frequency are corrected by applying a greater or a lesser brake load upon the motor.

As shown, the field strength may be varied by a rheostat 65 which is connected in circuit with the field winding of the motor. All of the details and electric connections of rheostat 65 have not been shown as such rheostats are well known and as it is common practice to employ rheostats for the purpose indicated. It is deemed sufficient to state that rheostat 65 includes a so-called stepless resistor 66 and a contact arm 67 which has one of its ends in contact with resistor 66 and its other end pivoted upon a stationary bracket 68.

The means for applying a brake load to motor 1ª is identical in part to the corresponding mechanism shown in Fig. 1 and previously described. Consequently, identical parts have been indicated by identical reference numerals and no further description thereof will be given while other parts which are similar but not identical to the corresponding parts shown in Fig. 1 have been indicated by corresponding reference numerals with the exponent "a" added.

Briefly, the brake shaft 3 previously described is fixed to the rotor of motor 1ª and driven thereby. Shaft 3 drives gear pump 5 through drive 4 and it drives gear 31 of differential 30 through drive 32 at a speed proportional to the speed of the motor 1ª. Shaft 34 of differential 30 is rotated at a measured speed under the control of chronometric mechanism 50 so that any variation in the speed of motor 1ª will cause shaft 38 of differential 30 to rotate in one direction or the other depending upon whether the motor speed increases or decreases in respect to the speed of shaft 34 as previously explained.

Gear pump 5 has its outlet connected by channel 7ª to the inlet of a throttle valve 8ª which is adjusted to provide an initial resistance to the flow of liquid therethrough and thereby enable gear pump 5 to exert a brake load upon motor 1ª.

Valve 8ª is exactly the same as the valve 8 previously described except that the dashpot 17—18 is omitted therefrom and the valve member 9 has its stem connected to the lower end of a bar 69 which is pivoted at its upper end upon a pin 70 fixed in contact arm 67 near the upper end thereof. Bar 69 is adapted to be swung upon pin 70 to shift valve member 9 in one direction or the other and thereby vary the brake load on motor 1ª, and the distance through which bar 69 may be swung is limited by two stops 71 which are fixed in contact arm 67 upon opposite sides of bar 69 near the lower end thereof.

The mechanism for swinging bar 69 upon pin 70 includes a hydraulic servo-motor which has a cylinder 72 arranged in a stationary position, a piston 73 fitted in cylinder 72 and urged toward the right by a spring 74, and a piston rod 75 having one of its ends fixed to piston 73 and its other end pivoted to bar 69 intermediate the ends thereof.

Servo-motor 72—73 is adapted to be operated by liquid supplied thereto from gear pump 5 under the control of a valve 76 which functions to open the right end of cylinder 72 either to gear pump pressure or to a drain channel 77 which discharges into reservoir 6 and to which the left end of cylinder 72 is connected in order to prevent air or liquid from being entrapped therein.

To this end, the right end of cylinder 72 is connected by a channel 78 to an exit port 79 which is formed in the body 80 of control valve 76 between an inlet port 81 and an exhaust port 82 also formed therein. Port 81 is connected by a channel 83 to channel 7ª intermediate the ends thereof and port 82 has a branch of drain channel 77 connected thereto.

The flow of liquid through port 79 is controlled by a valve member 84 which is closely fitted in the bore of valve body 80 to reciprocate therein. When valve member 84 is in its central or neutral position as shown, port 79 is blocked so that piston 73 is retained in a stationary position by the liquid trapped in the right end of cylinder 72.

When valve member 84 is shifted toward the left from its central or neutral position, port 79 is opened to port 82 so that spring 74 may move piston 73 toward the right and cause it to eject liquid from the right end of cylinder 72 through channel 78 and valve 76 into drain channel 77. When valve member 84 is shifted toward the right from its central or neutral position, port 79 is opened to port 81 and liquid may flow from channel 7ª through channel 83, valve 76 and channel 78 to the right end of cylinder 72 and move piston 73 toward the left against the resistance of spring 74.

Control valve 76 is operated in exactly the same manner that throttle valve 8 is operated in the controller shown in Fig. 1. That is, valve member 84 is continually urged toward the left by a spring 14 and it is moved toward the right each time the shaft 38 of differential 30 is rotated in a counterclockwise direction.

The movement of valve member 84 toward the left is retarded by a dashpot 17—18 which is identical with the dashpot 17—18 previously described and which functions and is supplied with liquid from a tank 22 in the manner previously described. All liquid passing through throttle valve 8ª is discharged into tank 22 through a channel 25ª and all excess liquid is drained from tank 22 through an overflow channel 85 which has one of its ends connected to tank 22 near the upper end thereof and its other connected to drain channel 77 intermediate the ends thereof.

Motion is transmitted to valve member 84 from shaft 38 by means of a lever 39ª which is arranged upon shaft 38. Lever 39ª is provided with a driving arm 44 and is the same as the lever 39 previously described except that its depending arm is somewhat shorter. The depending arm of lever 39ª is pivoted at its lower end to the upper end of a lever 86 which is adapted to engage a lug 15ª fastened to the stem of valve member 84. Lever 86 has its lower end pivoted by a pin 87 to one end of a follow-up rod 88 the other end of which is connected to bar 69 between pin 70 and the point at which servo-motor piston rod 75 is connected to bar 69.

The arrangement is such that, when a pallet 52 engages a tooth of escape wheel 51 and causes shaft 38 to be rotated in a counterclockwise direction as previously explained, lever 39ª will swing lever 86 upon pin 87 and lever 86 will engage lug 15ª and shift valve member 84 toward the right to permit liquid to flow to cylinder 72 and move piston 73 toward the left with the resultant operation of throttle valve 8ª and, when the pallet disengages the tooth of the escape wheel and permits weight 45 to fall and rotate shaft 38 in a clockwise direction as previously explained, lever 39ª will quickly swing lever 86 out of contact with lug 15ª and permit spring 14 to move valve member 84 toward the left to open cylinder 72 to drain channel 77 and thereby permit spring 74 to move piston 73 toward the right with the resultant operation of throttle valve 8ª.

The movement of valve member 84 toward the left under the influence of spring 14 is retarded by dashpot 17—18 so that, so long as the speed of motor 1ª remains constant, valve member 84 moves but little toward the left before link 86 again engages lug 15ª and moves it toward the right. Consequently, piston 73 moves throttle valve member 9 through so narrow a range that the brake load on motor 1ª varies but little during each swing of pendulum 56 and the overall brake load remains constant as long as the motor speed remains constant.

When the speed of motor 1ª increases above normal, shaft 38 will be rotated through a greater angular distance in a counterclockwise direction as long as the motor speed continues to increase and then it will oscillate through the original angular distance but in a range or arc which is displaced in a counterclockwise direction from the arc through which it operated when the motor was running at its normal speed.

Shaft 38 will cause lever 39ª to swing the upper end of lever 86 farther toward the right and cause lever 86 to shift valve member 84 farther toward the right so that liquid may enter cylinder 72 and move piston 73 toward the left. Piston 73 will swing bar 69 upon pin 70 and thus shift throttle valve member 9 toward the left to reduce the effective areas of orifices 13 and thereby increase the brake load on motor 1ª.

Swinging bar 69 toward the left causes follow-up rod 88 to move the pin 87 upon which lever 86 is pivoted toward the left and thereby tend to permit valve member 84 to move toward the left. The arrangement is such that valve member 84 is returned to its normal range of reciprocation the instant that motor 1ª is decelerated to its normal speed.

If the brake load does not become great enough to decelerate motor 1ª to its normal speed before throttle valve member 9 reaches the limit of its effective range, the lower end of bar 69 will engage a stop 71 and then servo-motor 72—73 will move the upper end of contact arm 67 along resistor 66 to vary the field strength and thereby decelerate motor 1ª.

Follow-up rod 88 will move the lower end of lever 36 toward the left as contact arm 67 moves along resistor 66 so that valve member 84 will be returned to its normal range and further movement of contact arm 67 will cease the instant that motor 1ª is decelerated to its normal speed.

Varying the field strength will cause deceleration of motor 1ª, as previously explained, but motor 1ª will not decelerate quite as fast as the field strength is varied so that the field strength is changed a trifle too much before motor 1ª reaches its normal speed. Consequently, deceleration of motor 1ª will continue until the motor speed is a trifle below normal with the result that the operating arc or range of lever 39ª is shifted slightly in a clockwise direction and spring 10 is permitted to shift control valve member 84 slightly toward the left.

Shifting control valve member 84 toward the left will open port 79 to port 82 and permit servo-motor 72—73 to shift throttle valve member 9 toward the right to increase the effective areas of orifices 13 and thereby decrease the brake load and permit motor 1ª to accelerate to its normal speed at which time lever 39ª will be oscillating in its normal range and the brake load will become constant. The speed of motor 1ª will then remain constant until again varied due to some cause such as a variation in load or frequency.

If the speed of motor 1ª would drop below normal, the brake load will be decreased to permit the motor to accelerate as explained above. If the motor has not accelerated to its normal speed before the entire brake load is released, the lower end of bar 69 will engage a stop 71 and then servo-motor 72—73 will move the upper end of contact arm 67 along resistor 66 to vary the field strength and thereby cause further acceleration of the motor.

Varying the field strength will accelerate the motor slightly above its normal speed and the brake load will be increased to decelerate the motor to its normal speed as explained above. A brake load is thus available at all times for correcting slight variations in motor speed while larger variations are corrected by varying the field strength.

*Fig. 6*

The controller shown in this figure is substantially the same as the controller shown in Fig. 5 with the exception of the means for varying the field strength and for operating the throttle valve. Consequently, those parts of the two controllers that are identical have been indicated by identical reference characters and will not be further described.

The mechanism for varying the field strength includes a rheostat 90 the details and electrical connections of which have not been illustrated as such rheostats and the application thereof to the control of motors are well known.

Rheostat 90 includes a stationary resistance member 91 and a contact arm 92 which is pivoted at its lower end upon a stationary shaft 93 and has its upper end in contact with one of a plurality of contacts 94 arranged upon resistance member 91. Contact arm 92 is yieldingly restrained from rotating upon shaft 93 by a spring pressed plunger 95 which is carried by arm 92 and carries an anti-friction roller 96 which engages one of a plurality of notches 97 formed in a stationary arcuate bar 98. Notches 97 are so shaped that the force required to start roller 96 out of its seat in one of notches 97 is greater than the force required to keep it moving toward the next adjacent notch.

Contact arm 92 is provided at its lower end with an internal gear segment 99 which is concentric with shaft 93 and meshes with a gear 100 arranged upon a shaft 101 carried by a lever 102 at the upper end thereof. Lever 102 is pivoted intermediate its ends upon shaft 93 and has its lower end connected to the piston rod 75 of servo-motor 72—73. Follow-up rod 88 is connected to lever 102 at a point between shaft 93 and piston rod 75.

Gear 100 meshes with a segmental gear 103 formed upon the hub of a lever 104 which is journaled upon shaft 93. Lever 104 is connected at its outer end by a link 105 to one end of a rod 106 the other end of which is connected to the valve member 9 of throttle valve 8ª. Rod 106 has an abutment 107 fixed thereon intermediate the ends thereof and arranged in a stationary casing 108 between two springs 109 and 110 which bear against it and against the ends of casing 108.

When springs 109 and 110 are equally loaded, there will be no net force tending to move rod 106 in either direction and valve member 9 will be held in its normal position with groove 9ᵈ (Fig. 2) approximately midway between the ends of orifices 13 so that approximately one-half the brake load will be applied to motor 1ª.

If motor 1ª accelerates beyond its normal speed, due either to a variation in the useful load or to a variation in frequency or voltage, gear 31 of differential 30 will be rotated faster relative to the speed of shaft 34 and cause lever 39ª to swing farther in a counterclockwise direction. Lever 39ª will shift control valve member 84 farther toward the right (Fig. 6) so that liquid from gear pump 5 may enter cylinder 72 and move piston 73 toward the left.

Piston 73 will swing the lower end of lever 102 toward the left and cause its upper end to move gear 100 toward the right. Plunger 95 will at first hold contact arm 92 stationary and, since gear segment 99 is fixed to arm 92, it will remain stationary and cause gear 100 in moving toward the right to rotate in a counterclockwise direction and rotate segmental gear 103 in a clockwise direction. Rotation of segmental gear 103 will cause lever 104, acting through link 105 and rod 106, to move throttle valve member 9 upward and reduce the effective areas of orifices 13, thereby increasing the brake load and tending to decelerate the motor.

As valve member 9 moves upward to increase the brake load on the motor, abutment 107 will compress spring 110 and, if the motor has not been decelerated to its normal speed by the time the entire brake load has been applied, the force exerted by spring 110 through rod 106, links 105, lever 104, segmental gear 103, gear 100 and gear segment 99 will be sufficient to overcome the resistance of the spring on plunger 95 and cause contact arm 92 to move suddenly from one contact 94 to the next contact 94 and roller 96 to snap over into the next notch 97.

Contact arm 92 in moving from one contact 94 to another varies the field strength to decelerate the motor and simultaneously permits spring 110 to expand and shift valve member 9 back to its normal position so that the brake load on the motor is reduced to approximately one-half of full brake load at the same instant that the field strength is varied.

Servo-motor 72—73 will continue to swing lever 102 upon shaft 93 until the motor has been decelerated to its normal speed so that, if the motor speed is not reduced to normal by shifting contact arm 92 from one contact 94 to the next contact 94, continued movement of servo-motor piston 73 will cause the brake load to be increased and the field strength varied alternatively in the above described manner until the motor has been decelerated to its normal speed.

If a variation in the useful load or a variation in frequency or voltage causes motor 1ª to be decelerated below its normal speed, the controller will operate in the reverse of the above described manner to correct such decrease in speed. Briefly, a reduction in motor speed below normal will cause gear 31 of differential 30 to be rotated slower relative to the speed of shaft 34 and cause lever 39ª to swing farther in a clockwise direction. Lever 39ª will permit spring 14 to shift control valve member 84 farther toward the left so that liquid may escape from cylinder 72 and permit spring 74 to move piston 73 toward the right.

Piston 73 will swing the lower end of lever 102 toward the right and cause its upper end to move gear 100 toward the left along gear segment 99, thereby causing gear 100 to rotate in a clockwise direction and rotate segmental gear 103 in a counterclockwise direction. Rotation of segmental gear 103 will cause abutment 107 to compress spring 109 and rod 106 to move throttle valve member 9 downward and increase the effective areas of orifices 13, thereby decreasing the brake load and tending to permit the motor to accelerate.

Servo-motor 72—73 will continue to swing lever 102 upon shaft 93 until the motor has accelerated to its normal speed so that if the motor has not reached its normal speed by the time the entire brake load has been released, the force stored in spring 109 will be sufficient to cause contact arm 92 to move from one contact 94 to the next contact 94 and valve member 9 to be returned to its normal position as above explained.

After each adjustment of contact arm 92 in one direction or the other, valve member 9 is returned to its normal position so that the brake load may be varied to compensate for small changes in useful load or small changes in frequency or voltage until a large change occurs and then the force stored in spring 109 or 110 becomes sufficient to shift contact arm 92 in one direction or the other to vary the field strength as above explained.

The invention herein set forth is susceptible of various modifications and adaptations without departing from the scope thereof as hereafter claimed.

The invention is hereby claimed as follows:

1. A speed controller for a prime mover, comprising means for imposing a brake load upon said prime mover, a three legged differential having a first leg driven by said prime mover at a speed proportional to the speed thereof and a second leg driven at a measured speed whereby any variation in the speed of said prime mover relative to said measured speed causes rotation of the third leg of said differential, means for varying the flow of energy to said prime mover to thereby vary the speed thereof, and means responsive to rotation of said third leg for first varying the brake load on said prime mover and then operating said energy varying means to thereby correct said variation in prime mover speed.

2. A speed controller for a prime mover, comprising means for imposing a brake load upon said prime mover, a chronometric mechanism, a three legged differential having a first leg driven by said prime mover at a speed proportional to the speed thereof and a second leg connected to said chronometric mechanism and driven at a speed proportional to the speed thereof whereby any variation in the speed of said prime mover relative to the speed of said chronometric mechanism causes rotation of the third leg of said differential, means for varying the flow of energy to said prime mover to thereby vary the speed thereof, and means responsive to rotation of said third leg for first varying the brake load on said prime mover and then operating said energy varying means to thereby correct said variation in prime mover speed.

3. A speed controller for a prime mover, comprising a three legged differential having a first leg driven by said prime mover at a speed proportional to the speed thereof and a second leg driven at a measured speed whereby any variation in the speed of said prime mover relative to said measured speed causes rotation of the third leg of said differential, means for imposing a brake load upon said prime mover to vary the speed thereof, means for varying the flow of energy to said prime mover to vary the speed thereof, a valve for controlling the operation of said brake load imposing means and for controlling the operation of said energy varying means, and means responsive to rotation of the third leg of said differential for operating said valve.

4. A speed controller for a prime mover, comprising a three legged differential having a first leg driven by said prime mover at a speed proportional to the speed thereof and a second leg driven at a measured speed whereby the third leg is rotated in response to any variation in the speed of said prime mover relative to said measured speed, a pump driven by said prime mover, a valve for resisting the discharge of liquid by said pump to thereby impose a brake load upon said prime mover, means for varying the flow of energy to said prime mover to thereby vary the speed thereof, and means responsive to rotation of the third leg of said differential for first operating said valve to vary the resistance to the flow of liquid therethrough and thereby vary the brake load on said prime mover and then operating said energy varying means.

5. A speed controller for a prime mover, comprising a pump driven by said prime mover, a chronometric mechanism, a three legged differential having a first leg driven by said prime mover at a speed proportional to the speed thereof and a second leg connected to said chronometric mechanism and driven at a speed proportional to the speed thereof whereby any variation in the speed of said prime mover relative to the speed of said chronometric mechanism causes rotation of the third leg of said differential, a valve for resisting the discharge of liquid by said pump to thereby impose a brake load upon said prime mover, means for varying the flow of energy to said prime mover to thereby vary the speed thereof, and means responsive to rotation of the third leg of said differential for first operating said valve to vary the resistance to the flow of liquid therethrough and thereby vary the brake load upon said prime mover and then operating said energy varying means.

6. A speed controller for a prime mover, comprising means for imposing a brake load upon said prime mover, a three legged differential having a first leg driven by said prime mover at a speed proportional to the speed thereof and a second leg driven at a measured speed whereby any variation in the speed of said prime mover relative to said measured speed causes rotation of the third leg of said differential, means for varying the brake load on said prime mover to thereby correct slight variations in prime mover speed, means for varying the flow of energy to said prime mover to correct greater variations in prime mover speed, a hydraulic servo-motor, means enabling said servo-motor to first operate said brake load varying means and then operate said energy varying means, means including a control valve for supplying motive liquid to said servo-motor, and means responsive to rotation of the third leg of said differential for operating said control valve.

7. A speed controller for a prime mover, comprising a three legged differential having a first leg driven by said prime mover at a speed proportional to the speed thereof and a second leg driven at a measured speed whereby the third leg is rotated in response to any variation in the speed of said prime mover relative to said measured speed, a pump driven by said prime mover, a valve for resisting the discharge of liquid by said pump to thereby impose a brake load upon said prime mover, means for varying the flow of energy to said prime mover to thereby vary the speed thereof, a hydraulic servo-motor for operating said valve and said energy varying means, means including a control valve for supplying motive liquid to said servo-motor, and means responsive to rotation of the third leg of said differential for operating said control valve.

8. A speed controller for a prime mover, comprising a three legged differential having a first leg driven by said prime mover at a speed proportional to the speed thereof and a second leg driven at a measured speed whereby the third leg is rotated in response to any variation in the speed of said prime mover relative to said measured speed, a pump driven by said prime mover, a valve for resisting the discharge of liquid by said pump to thereby impose a brake load upon said prime mover and correct slight variations in prime mover speed, means for varying the flow of energy to said prime mover to correct greater variations in prime mover speed, a hydraulic servo-motor, means enabling said servo-motor to first operate said valve and then operate said energy varying means, means including a control valve for supplying liquid to said servo-motor to operate the same, and means responsive to rotation of the third leg of said differential for operating said control valve.

9. The combination, with a prime mover, of a chronometric mechanism having an escapement and a shaft fixed to said escapement and rotating intermittently at a constant overall speed during operation of said mechanism, a three legged differential having one leg continuously driven by said prime mover at a speed proportional to the speed thereof and a second leg connected to said shaft whereby the third leg of said differential is caused to rotate in a given direction during each interruption in the rotation of said shaft, a lever carried by said third leg and rotatable therewith, means resisting rotation of said third leg in said direction and causing said third leg to rotate in the opposite direction during rotation of said shaft whereby said lever is oscillated through a given arc which remains stationary as long as the prime mover speed remains proportional to the overall speed of said shaft but which moves in one direction or the other in response to a variation in prime mover speed, means for varying the speed of said prime mover, a valve for controlling said speed varying means, an abutment carried by said valve and arranged in the path of said lever to enable said lever as it swings in one direction to shift said valve in said direction, means for moving said valve in the opposite direction upon said lever swinging in the opposite direction, and a dashpot for retarding the movement of said valve in said opposite direction.

10. The combination, with a prime mover, of a chronometric mechanism having an escapement and a shaft fixed to said escapement and rotating intermittently at a constant overall speed during operation of said mechanism, a three legged differential having one leg continuously driven by said prime mover at a speed proportional to the speed thereof and a second leg connected to said shaft whereby the third leg of said differential is caused to rotate in a given direction during each interruption in the rotation of said shaft, a lever carried by said third leg and rotatable therewith, means resisting rotation of said third leg in said direction and causing said third leg to rotate in the opposite direction during rotation of said shaft whereby said lever is oscillated through a given arc which remains stationary as long as the prime mover speed remains proportional to the overall speed of said shaft but which moves in one direction or the other in response to a variation in prime mover speed, means for imposing a brake load upon said prime mover, a valve for controlling the application of said brake load to said prime mover and shiftable in one direction or the other to vary said brake load and thereby correct variations in prime mover speed, an abutment carried by said valve and arranged in the path of said lever to enable said lever as it swings in one direction to shift said valve in said direction, means for moving said valve in the opposite direction upon said lever swinging in the opposite direction, and a dashpot for retarding the movement of said valve in said opposite direction.

11. The combination, with a prime mover, of a chronometric mechanism having an escapement and a shaft fixed to said escapement and rotating intermittently at a constant overall speed during operation of said mechanism, a three legged differential having one leg continuously driven by said prime mover at a speed proportional to the speed thereof and a second leg connected to said shaft whereby the third leg of said differential is caused to rotate in a given direction during each interruption in the rotation of said shaft, a lever carried by said third leg and rotatable therewith, means resisting rotation of said third leg in said direction and causing said third leg to rotate in the opposite direction during rotation of said shaft whereby said lever is oscillated through a given arc which remains stationary as long as the prime mover speed remains proportional to the one direction or the other in response to a variation in prime mover speed, a pump driven by said prime mover, a throttle valve for resisting the discharge of liquid by said pump to thereby impose a brake load upon said prime mover, said valve being shiftable in one direction or the other to vary said brake load and thereby correct variation in prime mover speed, an abutment carried by said valve and arranged in the path of said lever to enable said lever as it swings in one direction to shift said valve in said direction, means for moving said valve in the opposite direction upon said lever swinging in the opposite direction, and a dashpot for retarding the movement of said valve in said opposite direction.

12. The combination, with a prime mover, of a chronometric mechanism having an escapement and a shaft fixed to said escapement and rotating intermittently at a constant overall speed during operation of said mechanism, a three legged differential having one leg continuously driven by said prime mover at a speed proportional to the speed thereof and a second leg connected to said shaft whereby the third leg of said differential is caused to rotate in a given direction during each interruption in the rotation of said shaft, a lever carried by said third leg and rotatable therewith, means resisting rotation of said third leg in said direction and causing said third leg to rotate in the opposite direction during rotation of said shaft whereby said lever is oscillated through a given arc which remains stationary as long as the prime mover speed remains proportional to the overall speed of said shaft but which moves in one direction or the other in response to a variation in prime mover speed, means for imposing a brake load upon said prime mover, means for varying said brake load to thereby correct small variations in prime mover speed, means for varying the flow of energy to said prime mover to thereby correct greater variations in prime mover speed, a fluid operated servo-motor for operating said load varying means and said energy varying means, means for supplying motive fluid to said servo-motor, a valve for controlling the operation of said servo-motor, an abutment carried by said valve and arranged in the path of said lever to enable said lever as it swings in one direction to shift said valve in said direction, means for moving said valve in the opposite direction upon said lever swinging in the opposite direction, and a dashpot for retarding the movement of said valve in said opposite direction.

13. The combination, with a prime mover, of a chronometric mechanism having an escape wheel which rotates intermittently at a predetermined constant mean speed during operation of said mechanism, said escape wheel being alternately rotated through a given angular distance and then stopped, a three legged differential having one leg continuously driven by said prime mover at a speed proportional to the speed thereof and a second leg connected to said escape wheel whereby the third leg of said differential is caused to rotate in a given direction during each interruption in the rotation of said escape wheel, a lever carried by said third leg and rotatable therewith, means resisting rotation of said third leg in said direction and causing said third leg to rotate in the opposite direction during each intermittent rotation of said escape wheel whereby said lever is oscillated through a given arc which remains stationary as long as the prime mover speed remains proportional to the mean speed of said escape wheel but which moves in one direction or the other in response to a variation in prime mover speed, means for varying the speed of said prime mover, a valve for controlling said speed varying means, an abutment carried by said valve and arranged in the path of said lever to enable said lever as it swings in one direction to shift said valve in said direction, means for moving said valve in the opposite direction upon said lever swinging in the opposite direction and means for retarding the movement of said valve in said opposite direction whereby said valve moves through a very short distance regardless of the movement of said lever through a much greater distance.

14. The combination, with a prime mover, of a chronometric mechanism having an escape wheel which rotates intermittently at a predetermined constant mean speed during operation of said mechanism, said escape wheel being alternately rotated through a given angular distance and then stopped, a three legged differential having one leg continuously driven by said prime mover at a speed proportional to the speed thereof and a second leg connected to said escape wheel whereby the third leg of said differential is caused to rotate in a given direction during each interruption in the rotation of said escape wheel, a lever carried by said third leg and rotatable therewith, means resisting rotation of said third leg in said direction and causing said third leg to rotate in the opposite direction during each intermittent rotation of said escape wheel whereby said lever is oscillated through a given arc which remains stationary as long as the prime mover speed remains proportional to the mean speed of said escape wheel but which moves in one direction or the other in response to a variation in prime mover speed, means for imposing a brake load upon said prime mover, a valve for controlling the application of said brake load to said prime mover and shiftable in one direction or the other to vary said brake load and thereby correct variations in prime mover speed, an abutment carried by said valve and arranged in the path of said lever to enable said lever as it swings in one direction to shift said valve in said direction, means for moving said valve in the opposite direction upon said lever swinging in the opposite direction, and means for retarding the movement of said valve in said opposite direction whereby said valve is moved through a very short distance regardless of the movement of said lever through a much greater distance.

15. The combination, with a prime mover, of a chronometric mechanism having an escapement and a shaft fixed to said escapement and rotating intermittently at a constant overall speed during operation of said mechanism, a three legged differential having one leg continuously driven by said prime mover at a speed proportional to the speed thereof and a second leg connected to said shaft whereby the third leg of said differential is caused to rotate in a given direction during each interruption in the rotation of said shaft, a lever carried by said third leg and rotatable therewith, means resisting rotation of said third leg in said direction and causing said third leg to rotate in the opposite direction during rotation of said shaft whereby said lever is oscillated through a given arc which remains stationary as long as the prime mover speed remains proportional to the overall speed of said shaft but which moves in one direction or the other in response to a variation in prime mover speed, a pump driven by said prime mover, a throttle valve for resisting the discharge of liquid by said pump to thereby impose a brake load upon said prime mover, said valve being shiftable in one direction or the other to vary said brake load and thereby correct small variations in prime mover speed, means for varying the flow of energy to said prime mover to thereby correct greater variations in prime mover speed, a fluid operated servo-motor for operating said throttle valve and said energy varying means, means for supplying motive fluid to said servo-motor, a control valve for controlling the operation of said servo-motor, an abutment carried by said control valve and arranged in the path of said lever to enable said lever as it swings in one direction to shift said control valve in said direction, means for moving said control valve in the opposite direction upon said lever swinging in the opposite direction, and a dashpot for retarding the movement of said control valve in said opposite direction.

16. A speed controller for a prime mover, comprising means for imposing a brake load upon said prime mover, a chronometric mechanism driven by power derived from said prime mover, a three legged differential having a first leg driven by said prime mover at a speed proportional to the speed thereof and a second leg connected to said chronometric mechanism and driven at a speed proportional to the speed thereof whereby any variation in the speed of said prime mover relative to the speed of said chronometric mechanism causes rotation of the third leg of said differential, means for varying the flow of energy to said prime mover to thereby vary the speed thereof, and means responsive to rotation of said third leg for first varying the brake load on said prime mover and then operating said energy varying means to thereby correct said variation in prime mover speed.

17. A speed controller for a prime mover, comprising a pump driven by said prime mover, a chronometric mechanism driven by power derived from said prime mover, a three legged differential having a first leg driven by said prime mover at a speed proportional to the speed thereof and a second leg connected to said chronometric mechanism and driven at a speed proportional to the speed thereof whereby any variation in the speed of said prime mover relative to the speed of said chronometric mechanism causes rotation of the third leg of said differential, a valve for resisting the discharge of liquid by said pump to thereby impose a brake load upon said prime mover, means for varying the flow of energy to said prime mover to thereby vary the speed thereof, and means responsive to rotation of the third leg of said differential for first operating said valve to vary the resistance to the flow of liquid therethrough and thereby vary the brake load upon said prime mover and then operating said energy varying means.

WALTER FERRIS.